July 7, 1931.  G. W. BAKER  1,813,477
MANUFACTURE OF CORNER BEADS
Filed June 20, 1927  5 Sheets-Sheet 1
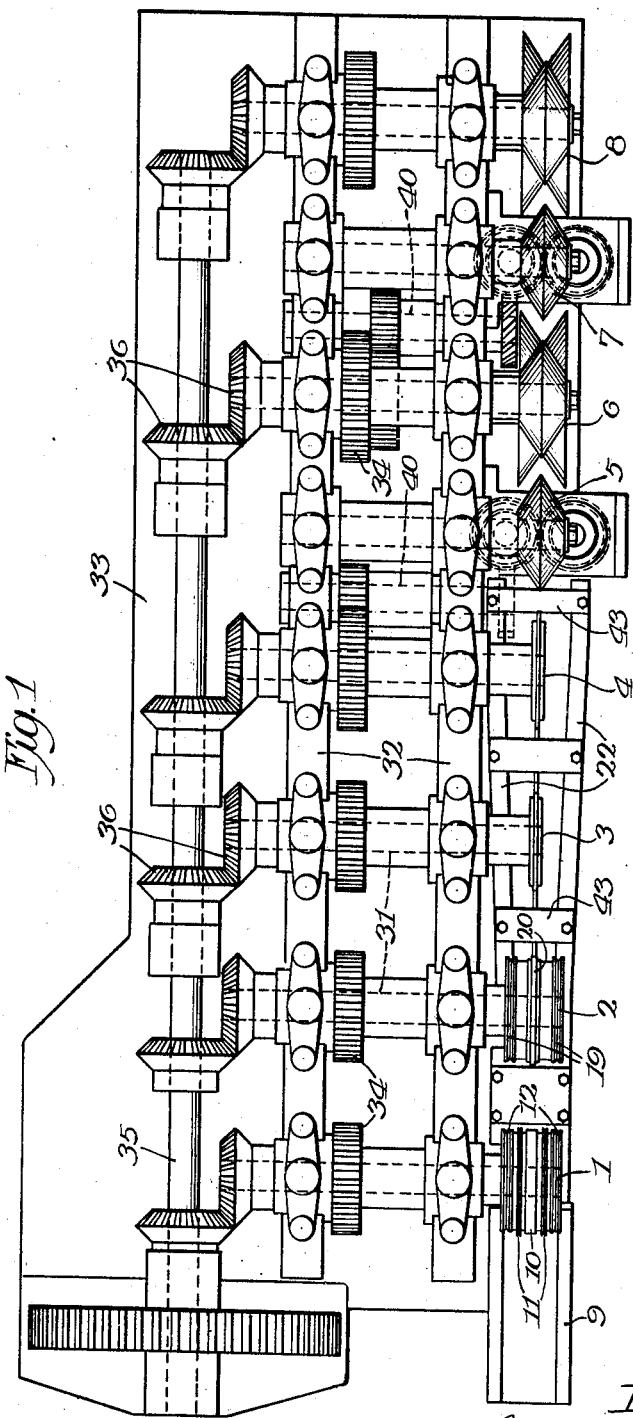

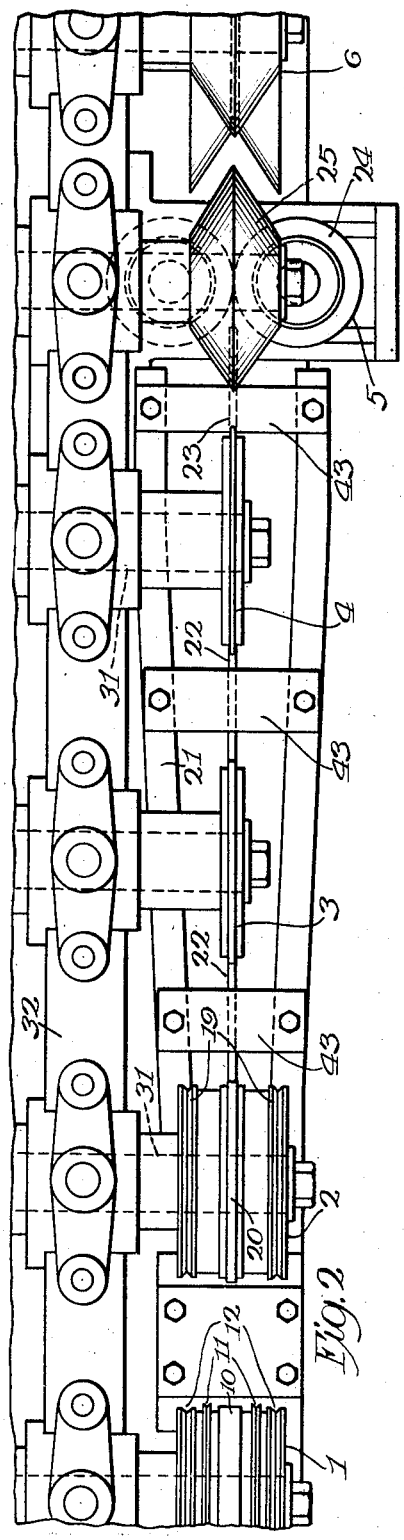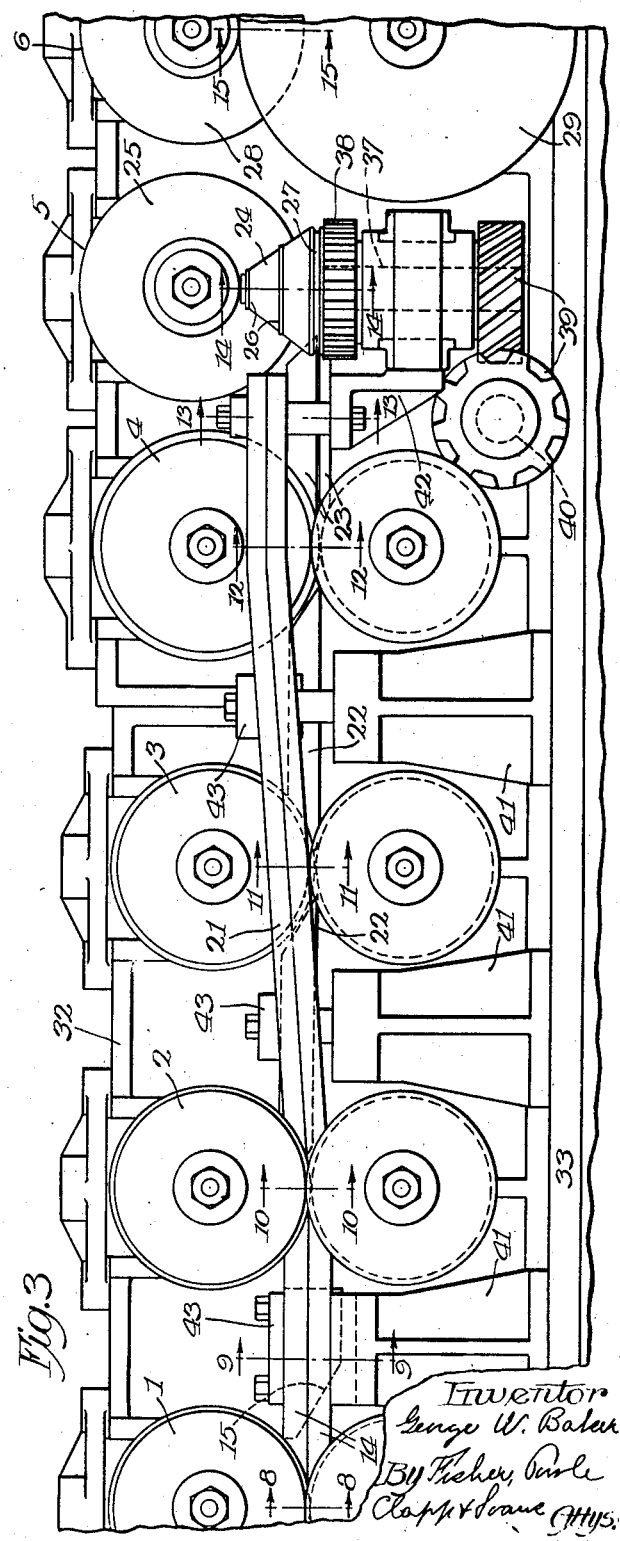

July 7, 1931.  G. W. BAKER  1,813,477
MANUFACTURE OF CORNER BEADS
Filed June 20, 1927  5 Sheets-Sheet 3
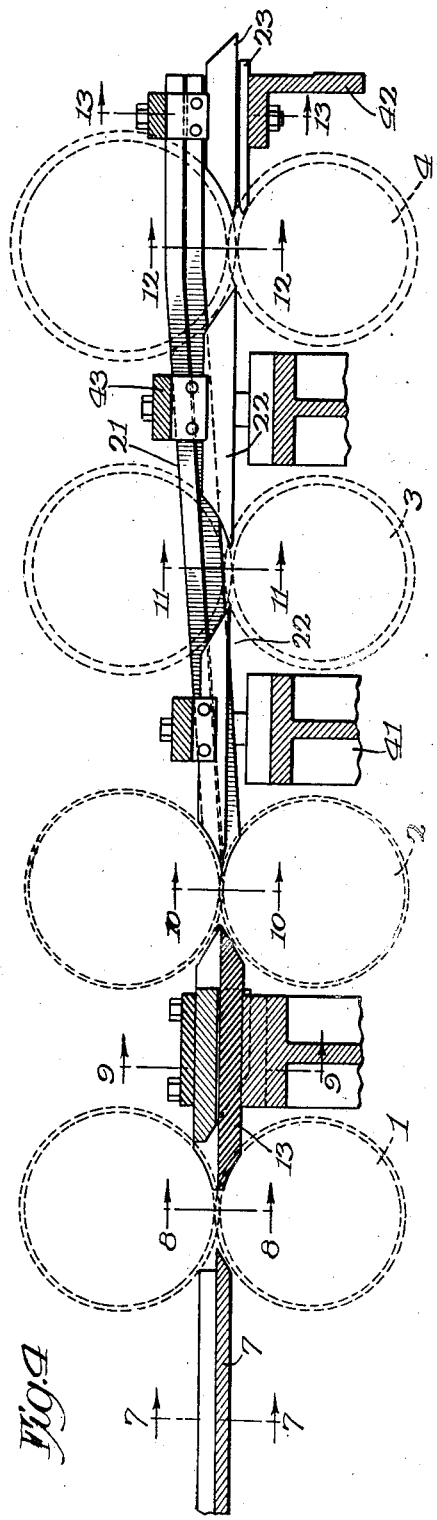
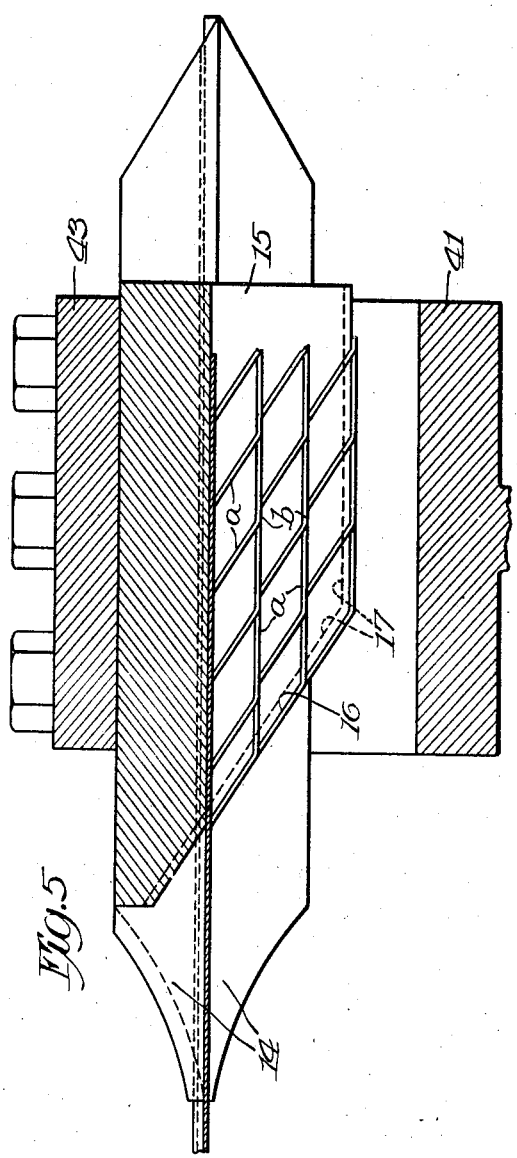
Inventor:
George W. Baker
By Fisher, Toole, Clapp & Doane
Attys.

July 7, 1931.  G. W. BAKER  1,813,477
MANUFACTURE OF CORNER BEADS
Filed June 20, 1927  5 Sheets-Sheet 4
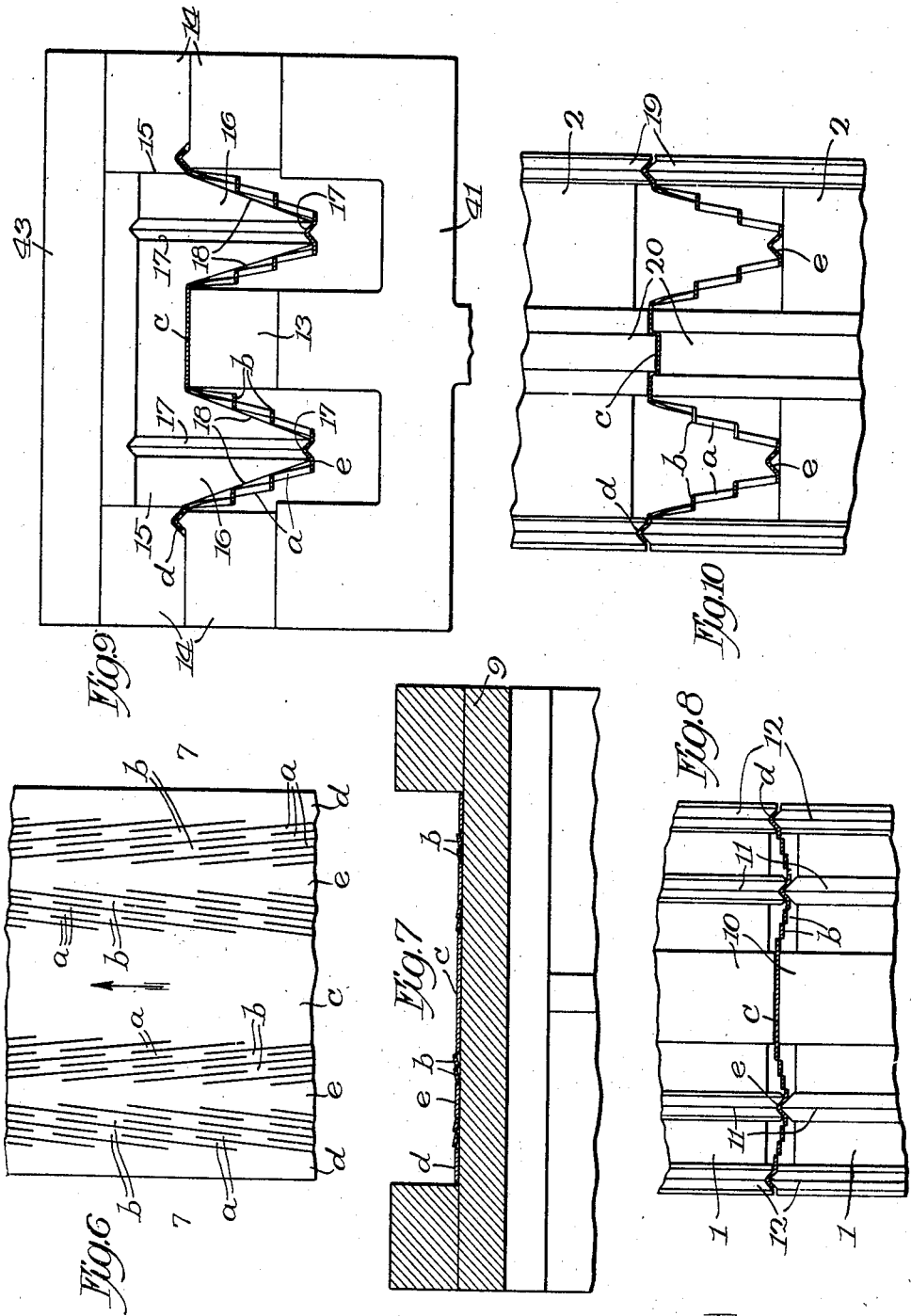

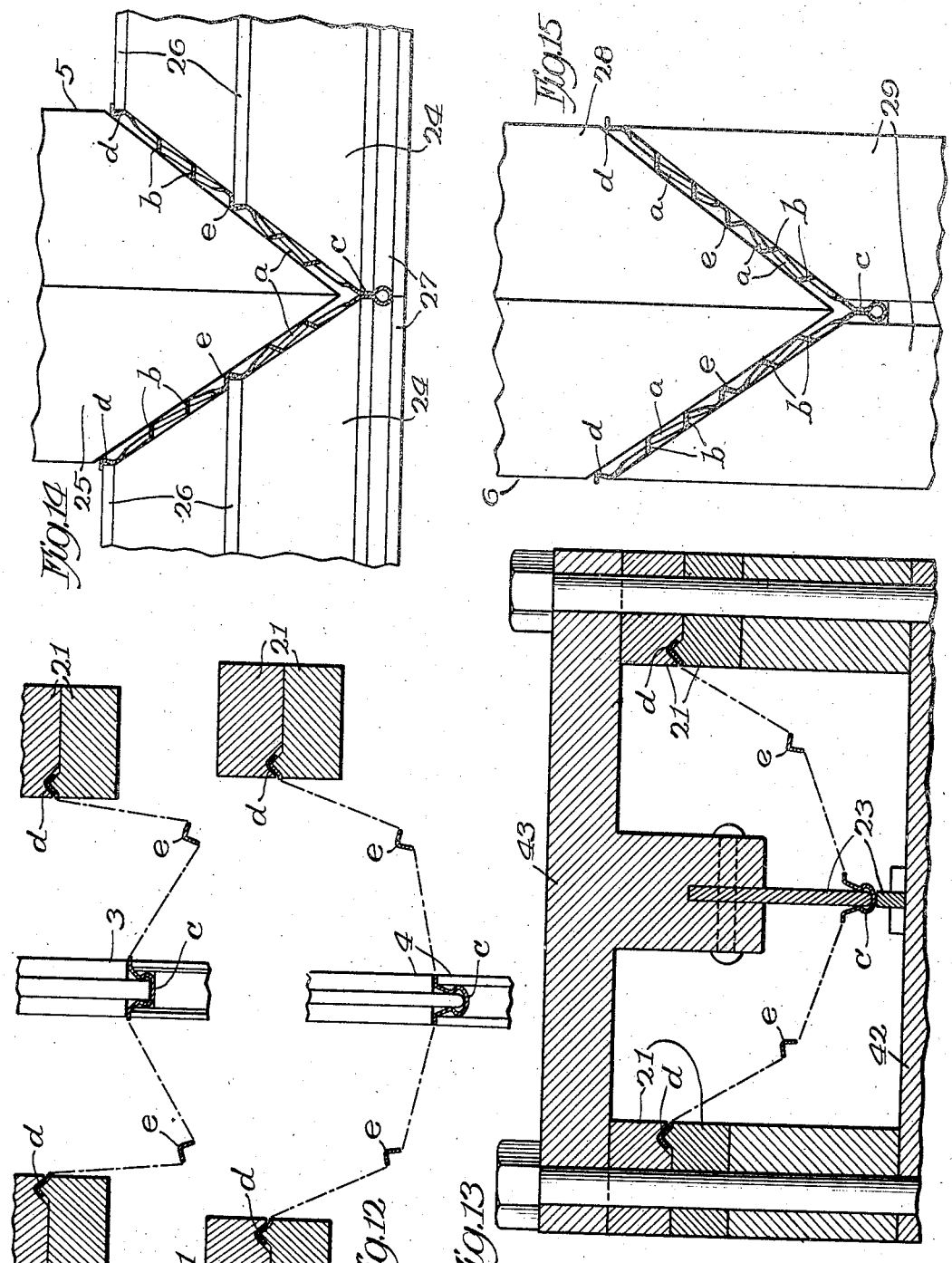

Patented July 7, 1931

1,813,477

UNITED STATES PATENT OFFICE

GEORGE W. BAKER, OF CHICAGO, ILLINOIS, ASSIGNOR, BY MESNE ASSIGNMENTS, TO UNITED STATES GYPSUM COMPANY, OF CHICAGO, ILLINOIS, A CORPORATION OF ILLINOIS

MANUFACTURE OF CORNER BEADS

Application filed June 20, 1927. Serial No. 200,083.

The present invention seeks to provide an improved process and apparatus for forming corner plaster terminal or so-called "corner bead" and particularly of the type shown in the U. S. Letters Patent No. 1,608,475, James H. Dean, November 23, 1926. Such corner bead comprises an outwardly projecting nosing or flange having a tubular edge, and divergent side portions or wings which are slitted and expanded, preferably to provide diamond-shape meshes, and which are provided with inwardly projecting ribs for spacing the mesh work from the wall so that the plaster may enter the meshes and be properly keyed to the side portions or wings of the corner bead.

In accordance with the present invention, sheet metal strips are cut or slashed on opposite sides of the mid-sections thereof and preferably in narrow, longitudinally extending zones or panels disposed between an unslitted mid-section and between narrow, unslitted marginal and intermediate sections. The intermediate, unslitted sections of the strips and preferably also the unslitted marginal sections are progressively formed into ribs and the mid-section of the strip is formed into a nosing, with the latter and the ribs projecting in opposite directions from the plane of the sheet. The slitted side sections of the strips are progressively expanded, spread laterally in the plane of the strip and also deflected transversely of such plane to open the slits into mesh work and to bring the side sections into two angularly disposed planes which diverge from the central nosing. Preferably, the formation of the nosing and the lateral spreading and deflecting of the side sections are effected simultaneously.

The foregoing and other features of the invention are hereinafter set forth in detail, are illustrated in the accompanying drawings and more particularly pointed out in the appended claims.

In the drawings:

Fig. 1 is a plan of the improved apparatus.

Fig. 2 is a plan on an enlarged scale of the roller dies and guides for effecting the formation of the corner bead.

Fig. 3 is an elevation of the parts shown in Fig. 2.

Fig. 4 is a longitudinal central section of the expanding, deflecting and spreading guides, with certain of the roller dies shown in dotted lines.

Fig. 5 is an enlarged view in elevation of one of the expanding dies or guides and illustrating its operation in effecting the expansion of the slitted panels of the strips.

Fig. 6 illustrates a portion of one of the slitted strips.

Figs. 7 to 15 inclusive are detail cross sections on the correspondingly numbered lines of Figs. 3 and 4, illustrating the successive operations of the apparatus upon the slitted metal strips.

The sheet metal strips are first cut or slashed, preferably by means of roller dies such as shown in the U. S. Letters Patent of James H. Dean, No. 1,664,247 dated March 27, 1928. As shown in Fig. 6, sections or panels on opposite sides of the mid-section of the strip are thus provided with rows of staggered slits so as to form parallel rows of strands $a$ with integral connecting bonds $b$ between the slits of each row and with the bonds of each row of slits opposite the slits of the adjacent rows. As shown, the slitted panels extend longitudinally of the strip and are disposed between a wide, unslitted mid-section $c$ and between narrow, unslitted, marginal and intermediate sections $d$ and $e$. Preferably, to avoid stretching of the strands during expansion, the rows of strands and bonds are slightly inclined to the longitudinal and are oppositely inclined in adjacent panels.

The improved apparatus in the preferred form shown comprises pairs of cooperating roller dies 1, 2, 3 and 4, which are arranged to engage the unslitted sections of the metal strips and continuously advance the same through the machine and which rolls are provided with suitable surfaces for progressively forming the marginal and intermediate unslitted sections $d$ and $e$ of the strips into shallow ribs, and also for progressively forming the wide mid-section $c$ of the strips into a projecting nosing or bead. The apparatus is also provided with two sets of finishing and setting rolls 5, 6, 7 and 8.

The strip having the opposite side portions thereof slitted as described, is fed into the machine in the direction indicated by the arrow in Fig. 6, and is guided into engagement with the initial pair of roller dies 1 by means of a trough-shaped guide 9 (see Figs. 1, 4 and 7). The section of the slitted metal strip shown in Fig. 7 is taken through the bonds $b$ as indicated by the line 7—7 of Fig. 6. The sections of the metal strip shown in Figs. 8 to 15 inclusive are also taken through the bonds. The rolls 1 are provided with cooperating pairs of disks 10, 11 and 12, which are arranged to engage the unslitted sections of the strip to advance the same. The disks 10 which engage the mid-sections $c$ of the strip are cylindrical, while the disks 11 and 12 are provided with co-operating V-shaped ribs and grooves for forming the marginal and intermediate unslitted strips $d$ and $e$ into upwardly projecting, shallow V-shaped ribs (see Fig. 8). Preferably the bights or passes of the disks 11 are slightly below the level of those of the disks 10 and 12 so that, as indicated, the slitted panels are slightly opened.

Between the rolls 1 and 2 the mid-sections of the strips pass over guides 13 (see Figs. 4 and 9), and the marginal ribbed sections $d$ move through correspondingly shaped passes formed by pairs of guides 14. At the same time the pairs of slitted panels on opposite sides of the strips and the intermediate ribs pass over two expanding or deflecting guides or blocks 15. These deflecting guides are substantially V-shaped in section and are provided with triangular, inclined faces 16 and horizontal lower edges, these faces and edges being provided with grooves 17 for receiving the intermediate ribbed strips $e$. While the marginal and mid-sections of the strip are maintained in its original plane, the intermediate ribs and the slitted panels are deflected from such plane by the expanding guides 15 and the slits are opened into diamond-shaped meshes formed by diagonally and longitudinally disposed strands, as most clearly shown in Fig. 5. In this operation each side section of the strip is longitudinally corrugated and the panels are deflected as they pass over the inclined faces 16 into longitudinally inclined planes and then, as they pass over the edges 18 of these faces, into transversely and oppositely inclined planes as most clearly shown in Fig. 9. The sections of the slitted panels are held against expansion until they pass over the inclined edges 18, and these edges are so disposed that each diagonal series of strands passes simultaneously over one such edge. In this way the expansion is effected by bending and without substantial stretching of the strands.

The rolls 2 which next engage the strips are provided with ribbed and grooved disks 19 for engaging the marginal ribbed sections $d$, and with disks 20 having relatively wide ribs and grooves for engaging the mid-sections $c$ of the strips for forming the central portions of the mid-sections into shallow ribs of substantially U-shaped section, as shown in Fig. 10.

As the marginal ribs $d$ of the strips leave the rolls 2, they are engaged by pairs of spreading and deflecting guide bars 21 which form passes corresponding in outline to the marginal ribs. These spreading and deflecting guides diverge in two different directions from the path of movement of the center of the strips. That is to say, as shown in the drawings, they diverge both horizontally and vertically so that the corrugated or V-shaped side sections of the strip which have been expanded as described, are progressively or gradually flattened and brought substantially into two planes which diverge from the mid-section of the strip (see Figs. 11, 12 and 13).

Simultaneously with the spreading and deflecting of the margins of the strip, the formation of the mid-section $c$ into a projecting nosing or bead proper is progressively effected by the pairs of cooperating roller dies or disks 3 and 4 which are arranged between the spreading and deflecting guides 21. The lower rolls 3 and 4 are grooved as shown in Figs. 11 and 12, and the upper rolls are provided with ribs which are however, considerably narrower than the grooves of the corresponding rolls so that they engage only the central portions of the U-shaped ribs formed by the disks 20, and thereby partially form the mid-section into a projecting nosing or bead having an enlarged edge and a relatively narrower neck. The rolls 3 and 4 also cooperate with the deflecting guides 21 to spread or flatten the expanded side sections of the strip. The movement of the central or mid-sections $c$ of the strips between the rolls 2 and 3 and between the rolls 3 and 4 is preferably guided by narrow bars 22 (see Figs. 3 and 4) which are disposed above the path of movement of the central portions of the mid-sections. As these mid-sections leave the rolls 4 they pass between a pair of guides 23 (see Figs. 4 and 13).

The finishing and setting rolls have V-shaped passes. The passes of the rolls 5 are formed by two conical roller dies 24 mounted on vertical axes and a roller die 25 mounted on a horizontal axis and having two conical working faces extending downwardly between the conical rolls 24. The latter are provided with angular ribs 26 for engaging the marginal and intermediate ribbed sections $d$ and $e$ of the strips, and with grooved portions or disks 27 which engage and complete the formation of the nosing or bead proper and which bring the sides of the neck of the nosing into contact as shown in Fig. 14.

The rolls 6 comprise an upper die 28 similar in form to the roller die 25 and two oppositely disposed conical roller dies 29 mounted on a horizontal axis. The set of rolls 7 is similar in construction to the rolls 5 and the set of rolls 8 is similar to the rolls 6. The two sets of finishing and setting rolls complete the formation of the corner bead and straighten and set the same.

The rolls having horizontal axes are mounted upon horizontal shafts 31 which are journaled in suitable bearings in upright frames 32 which are mounted upon a bed plate 33. The shafts of cooperating pairs of rolls are connected by gears 34 and one roll of each pair is driven from a longitudinally extending main shaft 35 through the medium of pairs of beveled gears 36. The conical roller dies 24 of the sets of rolls 5 and 7 are mounted on vertical shafts 37, are connected together by gears 38 and are driven by skew gears 39 from horizontal shafts 40, the latter in turn being geared to adjacent horizontal shafts that are driven from the main shaft 35. All of the rolls are driven except the upper rolls 25 of the sets of rolls 5 and 7.

The roller dies are mounted upon the outer ends of the horizontal shafts 31 and the guides 13, 14, 15, 21, 22 and 23 are mounted on brackets 41 and 42 at the forward portion of the bed plate 33 and upon cross pieces 43 carried by these brackets.

The entrance ends of the guides, with the exception of the expanding or deflecting guides 15, are preferably conformed to and are arranged close to the surfaces of the adjacent roller dies so as to properly strip the metal from the dies. Preferably, also, the delivery ends of the spreading and deflecting guides 21 are provided with short parallel sections as shown in Figs. 2, 3 and 4.

Obviously changes may be made in the details set forth without departure from the scope of the appended claims.

I claim as my invention:

1. The method of forming corner bead which comprises slitting sections of a metal strip between unslitted marginal, intermediate and mid-sections, deflecting the intermediate unslitted sections from the plane of the strip to expand the slitted sections, deflecting the unslitted marginal sections in two directions from the mid-section to flatten the portions of the strip on opposite sides of the mid-section and bring the same into two divergent planes and forming the unslitted mid-section into a nosing.

2. The method of forming corner bead which comprises slitting sections of a metal strip between unslitted marginal, intermediate and mid-sections, continuously advancing the strip longitudinally, progressively deflecting the intermediate unslitted sections from the plane of the strip to expand the slitted sections, deflecting the unslitted marginal sections in two directions at right angles to the direction of movement of the strip to flatten the portions of the strip on opposite sides of the mid-section and bring the same into two divergent planes, and forming the unslitted mid-section into a projecting nosing.

3. The method of forming corner bead which comprises slitting sections of a metal strip between unslitted, marginal, intermediate and mid-sections, ribbing the marginal and intermediate unslitted sections, continuously advancing the strip longitudinally, deflecting the intermediate ribbed sections from the plane of the strip to expand the slitted sections, and then simultaneously forming the unslitted mid-section into a projecting nosing and deflecting the marginal ribbed sections in two directions from the mid-section to flatten the portions of the strip on opposite sides of the mid-section and bring the same into two planes divergent from each other and from the formed nosing.

4. The method of forming corner bead which comprises slitting sections of a metal strip between unslitted marginal, intermediate and mid-sections, progressively forming the intermediate unslitted sections into V-shaped ribs and the unslitted mid-section into a nosing projecting in opposite directions from the plane of the strip, progressively deflecting the intermediate unslitted sections from the plane of the strip to expand the slitted sections, and progressively spreading and deflecting the margins of the strip in two directions from the mid-section to bring the portions of the strip on opposite sides of the mid-section into two planes divergent from each other and from the plane of the nosing.

5. Apparatus for forming corner bead from a metal strip having slitted sections on opposite sides of an unslitted mid-section, comprising sets of rolls for engaging the margins and the mid-section of the strip to advance the same, deflecting guides intermediate said rolls for expanding the slitted side-sections of the strip, guides diverging in two directions for receiving the margins of the expanded side-sections, sets of rolls between said guides for progressively forming the mid-section of the strip into a nosing while maintaining the same substantially straight, and setting and finishing rolls for completing and straightening the corner bead.

6. Apparatus for forming corner bead from metal strips having slitted panels disposed between unslitted mid-sections and unslitted marginal and intermediate sections, comprising sets of rolls for engaging the unslitted sections to advance the strip and form the marginal and intermediate sections into ribs and the mid-section into a nosing with the ribs and nosing projecting in opposite directions and co-operating deflecting and guiding means arranged to engage the marginal and intermediate unslitted sections and expanded slitted panels and bring the same substantially into two planes diverging from the nosing.

7. Apparatus for forming corner bead from metal strips having slitted panels disposed between unslitted mid-sections and unslitted marginal and intermediate sections, comprising sets of rolls for engaging the unslitted sections to advance the strip and form the marginal and intermediate sections into ribs and the mid-section into a nosing with the ribs and nosing projecting in opposite directions from the plane of the strip, expanding guides for deflecting the intermediate unslitted sections from the plane of the strip to expand the slitted panels, deflecting guides arranged to engage the marginal ribbed sections and partially flatten the expanded side portions of the strip and bring the same into two planes diverging from the formed nosing, and finishing and straightening rolls for completing the formation of the nosing and the flattening of the sides of the strip.

8. Apparatus for forming corner bead from strips having slitted panels disposed between unslitted marginal, intermediate and mid-sections and with the slits in adjacent panels oppositely inclined, comprising sets of roller dies for engaging the unslitted sections of the strip to advance the same and form the marginal and intermediate sections into ribs and the mid-section into a projecting nosing, cooperating V-shaped guides having triangular inclined faces for deflecting and expanding the slitted panels, diverging guides for engaging the marginal ribbed sections disposed on opposite sides of the sets of nose-forming rolls and cooperating therewith to partially flatten the expanded side portions of the strip and bring the same substantially into two divergent planes, and sets of rolls for completing and straightening the formed corner bead.

9. In an apparatus for forming corner beads from metal strips having slitted side-sections, the combination of means for feeding the strip endwise, means for progressively expanding the moving slitted strips to open the slits into meshes, means for laterally spreading expanded side-sections of the moving strip and for deflecting the same into divergent planes, and means for forming the mid section of the moving strip into a projecting nosing.

10. In an apparatus for forming corner beads from metal strips having slitted side-sections, sets of feed rolls for advancing the strip, expander guides located between the sets of rolls for expanding the advancing slitted strip, other rolls for bending the mid section of the advancing strip into a tubular nosing, and spreader and deflector guides located between the sets of rolls for laterally spreading and deflecting the expanded side-sections of the advancing strip into planes diverging from the nosing.

GEORGE W. BAKER.